United States Patent
Yi et al.

(10) Patent No.: US 8,253,893 B2
(45) Date of Patent: Aug. 28, 2012

(54) TRANSFLECTIVE LIQUID CRYSTAL DISPLAY DEVICE HAVING A COLOR FILTER AND METHOD FOR FABRICATING THEREOF

(75) Inventors: Jong-Hoon Yi, Seoul (KR); Oh Nam Kwon, Cheonan-si (KR); Kyoung-Su Ha, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/711,819

(22) Filed: Feb. 24, 2010

(65) Prior Publication Data

US 2010/0149466 A1    Jun. 17, 2010

Related U.S. Application Data

(62) Division of application No. 11/882,862, filed on Aug. 6, 2007, now Pat. No. 7,697,092, which is a division of application No. 10/952,780, filed on Sep. 30, 2004, now Pat. No. 7,265,808, which is a division of application No. 10/029,967, filed on Dec. 31, 2001, now Pat. No. 6,809,791.

(30) Foreign Application Priority Data

Feb. 1, 2001  (KR) .................................. 2001-4937
Feb. 2, 2001  (KR) .................................. 2001-5044

(51) Int. Cl.
    *G02F 1/1335* (2006.01)

(52) U.S. Cl. .......................... 349/106; 349/110; 349/114
(58) Field of Classification Search .................. 349/106, 349/110, 114, 160
    See application file for complete search history.

(56) References Cited

U.S. PATENT DOCUMENTS

| | | | |
|---|---|---|---|
| 4,632,514 A | 12/1986 | Ogawa et al. | |
| 5,305,154 A * | 4/1994 | Sumi et al. | 359/885 |
| 5,668,649 A | 9/1997 | Suzuki et al. | |
| 5,831,701 A | 11/1998 | Matsuyama et al. | |
| 5,956,112 A | 9/1999 | Fujimori et al. | |
| 6,259,499 B1 | 7/2001 | Yamanashi | |
| 6,476,889 B2 | 11/2002 | Urabe et al. | |
| 6,476,890 B1 * | 11/2002 | Funahata et al. | 349/113 |
| 6,540,361 B1 | 4/2003 | Hayashi | |
| 6,593,982 B2 | 7/2003 | Yoon et al. | |
| 6,624,860 B1 | 9/2003 | Narutaki et al. | |
| 6,657,700 B2 | 12/2003 | Sako et al. | |
| 7,265,808 B2 | 9/2007 | Yi et al. | |

FOREIGN PATENT DOCUMENTS

KR     1998-041099 A    8/1998

* cited by examiner

*Primary Examiner* — Michael Caley
(74) *Attorney, Agent, or Firm* — Birch, Stewart, Kolasch & Birch, LLP

(57) ABSTRACT

A color filter substrate for a liquid crystal display device includes a base substrate having a transmissive portion and a reflective portion. The transmissive portion has a groove, a color filter layer on the substrate, and a black matrix on the color filter layer.

9 Claims, 14 Drawing Sheets

US 8,253,893 B2

TRANSFLECTIVE LIQUID CRYSTAL DISPLAY DEVICE HAVING A COLOR FILTER AND METHOD FOR FABRICATING THEREOF

CROSS REFERENCE

This application is a Divisional of application Ser. No. 11/882,862 filed on Aug. 6, 2007, now U.S. Pat. No. 7,697,092, which is a Divisional of application Ser. No. 10/952,780 filed on Sep. 30, 2004, now U.S. Pat. No. 7,265,808, which is a Divisional of application Ser. No. 10/029,967, filed on Dec. 31, 2001, now U.S. Pat. No. 6,809,791, and for which priority is claimed under 35 U.S.C. §120; and this application claims the benefit of Korean Patent Applications No. 2001-4937, filed on Feb. 1, 2001, and No. 2001-5044, filed on Feb. 2, 2001, under 35 U.S.C. §119. The entirety of each of these applications is hereby incorporated by reference.

BACKGROUND OF THE INVENTION

1. Field of the Invention

The present invention relates to a liquid crystal display device, and more particularly to a transflective liquid crystal display device.

2. Description of Related Art

Recently, liquid crystal display (LCD) devices with light, thin, and low power consumption characteristics are used in office automation equipment and video units and the like. Such LCDs typically use a liquid crystal (LC) interposed between upper and lower substrates with an optical anisotropy. Since the LC has thin and long LC molecules, the alignment direction of the LC molecules can be controlled by applying an electric field to the LC molecules. When the alignment direction of the LC molecules is properly adjusted, the LC is aligned and light is refracted along the alignment direction of the LC molecules to display images.

In general, LCD devices are divided into transmissive LCD devices and reflective LCD devices according to whether the display device uses an internal or external light source.

A conventional transmissive LCD device includes an LCD panel and a backlight device. The incident light from the backlight is attenuated during the transmission so that the actual transmittance is only about 7%. The transmissive LCD device requires a high, initial brightness, and thus electrical power consumption by the backlight device increases. A relatively heavy battery is needed to supply a sufficient power to the backlight of such a device, and the battery can not be used for a lengthy period of time.

In order to overcome the problems described above, the reflective LCD has been developed. Since the reflective LCD device uses ambient light instead of the backlight by using a reflective opaque material as a pixel electrode, it is light and easy to carry. In addition, the power consumption of the reflective LCD device is reduced so that the reflective LCD device can be used as an electric diary or a PDA (personal digital assistant).

However, the reflective LCD device is affected by its surroundings. For example, the brightness of ambient light in an office differs largely from that of the outdoors. Therefore, the reflective LCD device can not be used where the ambient light is weak or does not exist. In order to overcome the problems described above, a transflective LCD device has been researched and developed. The transflective LCD device can be transferred according to the user's selection from the transmissive mode to the reflective mode, or vise versa.

FIG. 1 is a schematic perspective view of a conventional transflective LCD device 11.

In FIG. 1, the conventional transflective LCD device 11 includes upper and lower substrates 15 and 21 with an interposed liquid crystal 23. The upper and lower substrates 15 and 21 are sometimes respectively referred to as a color filter substrate and an array substrate. On a surface facing the lower substrate 21, the upper substrate 15 includes a black matrix 16 and a color filter layer 18. The color filter layer 18 includes a matrix array of sub-color fiters 17 of red (R), green (G), and blue (B) that are formed such that each color filter is bordered by the black matrix 16. The upper substrate 15 also includes a common electrode 13 over the color filter layer 18 and over the black matrix 16. On a surface facing the upper substrate 15, the lower substrate 21 includes an array of thin film transistors (TFTs) "T" that act as switching devices. The array of TFTs is formed to correspond with the matrix of color filters. A plurality of crossing gate and data lines 25 and 27 are positioned such that a TFT is located near each crossing of the gate and data lines 25 and 27. The lower substrate 21 also includes a plurality of pixel electrodes 19, each in an area defined between the gate and data lines 25 and 27. Such areas are often referred to as pixel regions "P." Each pixel electrode 19 includes a transmissive portion "A" and a reflective portion "C". The transmissive portion "A" is usually formed from a transparent conductive material having a good light transmittance, for example, indium-tin-oxide (ITO). Moreover, a conductive metallic material having a superior light reflectivity is used for the reflective portion "C".

FIG. 2 is a schematic cross-sectional view of a conventional transflective LCD device such as the device 11 of FIG. 1.

In FIG. 2, upper and lower substrates 15 and 21 are facing and spaced apart from each other and a liquid crystal layer 23 is interposed therebetween. A backlight apparatus 45 is disposed over the outer surface of the lower substrate 21. On the inner side of the upper substrate 15, a color filter layer 18 for passing only the light of a specific wavelength and a common electrode 14 functioning as one electrode for applying a voltage to the liquid crystal layer 23 are subsequently formed. On the inner surface of the lower substrate 21, a pixel electrode 32 functioning as the other electrode for applying a voltage to the liquid crystal layer 23, a passivation layer 34 having a transmissive hole 31 exposing a portion of the pixel electrode 32, and a reflective plate 36 are subsequently formed. An area corresponding to the reflective plate 36 is a reflective portion "C" and an area corresponding to the portion of the pixel electrode 32 exposed by the transmissive hole 31 is a transmissive portion "A".

A cell gap "$d_1$" at the transmissive portion "A" is about twice of a cell gap "$d_2$" at the reflective portion "C" to reduce the light path difference. A retardation "$\Delta n \cdot d$" of the liquid crystal layer 23 is defined by a multiplication of refractive index anisotropy "$\Delta n$" with a cell gap "$d$" and the light efficiency of the LCD device is proportional to the retardation. Therefore, to reduce the difference of light efficiencies between the reflective and transmissive modes, the retardations of the liquid crystal layer 23 at two portions should be nearly equal to each other by making the cell gap of the transmissive portion larger than that of the reflective portion.

However, even though the light efficiencies of the liquid crystal layer between the reflective and transmissive modes become equal by making the cell gaps different, the light passing the color filters at different locations is different so that the brightness can be different at the front of the display device. The transmittance of the color filter resin whose absorption coefficient is high for a specific wavelength and low for the other wavelengths has the following relation considering only the absorption, i.e., the transmittance is inversely proportional to the absorption coefficient and the distance that light passes:

$$T=\exp(-\alpha(\lambda)d)$$

where T is transmittance, $\alpha(\lambda)$ is an absorption coefficient depending on the wavelength and d is a distance that light passes.

Since the color filter resin is a viscous material, the thickness of the color filter resin is hard to control and the color filter layer can not be made less than a specific thickness. Therefore, the color filter layers of the reflective and transmissive portions have the same thickness and the different absorption coefficient (i.e., different material) for the uniform transmittance.

However, if the color filter layers of the reflective and transmissive portions are formed of different materials, the process and the cost would be increased and the yield would be decreased.

To solve the above problems, a fabricating method of the color filter layers with the same resin is suggested. In this method, the color filter layers at the reflective and transmissive portions have the same absorption coefficient but a different thickness so that the transmittance has the same value.

FIGS. 3A and 3B are transmittance spectrums of first and second red color filter layers for the reflective mode having a specific thickness and two times the specific thickness, respectively.

Generally, a visible light has a wavelength ranging about 400 to 700 nanometers. Red (R), green (G) and blue (B) colors roughly correspond to wavelengths of 650, 550 and 450 nanometers, respectively.

In FIG. 3A, the transmittances at wavelengths corresponding to R, G and B are about 97%, 20% and 58%, respectively. Even though the transmittance for red color is high, the transmittances for the other colors are also not negligible so that a satisfying color purity is not obtained.

In FIG. 3B, since the second red color filter layer has twice the thickness and square transmittance compared with the first red color filter layer of FIG. 2A, the transmittances at wavelengths corresponding to R, G and B are about 94%, 4% and 34%, respectively. Although the transmittance is decreased for all colors, the decreased amount is different for the individual colors, for example, about 5%, 16% and 24% for R, G and B, respectively.

Therefore, the color purity of the second red color filter layer is improved and this result can be applied for the green and blue color filters so that the transmittance and color purity of the transflective LCD device using the same kind of color filter resin can be uniform for the reflective and transmissive portions.

A transflective LCD device using a dual thickness color filter (DCF) of the above-mentioned principle is suggested in Korean Patent Application No. 2001-9979 of the applicant.

FIG. 4 is a cross-sectional view of a transflective LCD device using the DCF according to a related art.

In FIG. 4, a transparent buffer layer 64 is formed on the inner surface of the upper substrate 15 only at a reflective portion "C", and a color filter layer 62 is formed on the entire upper substrate 15. Therefore, the color filter layer 62 of a transmissive portion "A" is thicker than that of the reflective portion "C" so that the color purity of the transmissive portion "A" can be improved. The transparent buffer layer 64 is formed by depositing and patterning one of an insulating material group comprising acrylic resin, benzocyclobutene (BCB) and silicon nitride (SiNx). Therefore, the buffer layer 64 of a yellowish color is not perfectly transparent and the transmittance of the buffer layer 64 is lower than that of glass substrate. Moreover, since light is partially reflected at the interface between the buffer layer 64 and the substrate 15, the transmittance at the reflective portion "C" is more decreased.

FIGS. 5A and 5B are cross-sectional views of color filter substrates using the DCF having transparent buffer layers of first and second thicknesses, respectively, according to a related art.

In FIG. 5A, the substrate 15 has a transmissive portion "A" and a reflective portion "C". A black matrix 70 and a transparent buffer layer 64 are formed in the reflective portion "C" and a color filter layer 62 is formed on the entire surface of the substrate 15. Since the transparent buffer layer 64 of a first thickness has a low step 52 at the borderline of the transmissive portion "A" and the reflective portion "C" so that the surface of the color filter layer 62 can be planarized. Moreover, since the color filter layer 62 at the transmissive portion "A" is thicker than that at the reflective portion "C", the color purity can be improved at the transmissive portion "A". However, since the thickness of the transparent buffer layer 64 has a limit for the planarization of the color filter layer 62, the thickness ratio of the color filter layer 62 also has a limit and the improvement of the color purity is limited.

In FIG. 5B, to have a desired thickness ratio of the color filter layer 62, the transparent buffer layer 64 has a second thickness higher than the first thickness of FIG. 5A and a high step 54 at the borderline of the transmissive portion "A" and the reflective portion "C". Since the color filter layer 64 is made of a viscous resin and formed according to the surface of the underlayer, the color filter layer 64 also has a step 55 at the top surface. Therefore, the difference "$\Delta d$" between the designed thickness $d_3$ and the fabricated thickness $d_4$ occurs and the improvement of the color purity of the transmissive portion "A" is limited.

Generally, the thickness of a conventional color filter layer for the reflective LCD device is controlled to have the average transmittance in the range of about 55 to 70%. If the thickness of the color filter layer is increased, the transmittance and the color appearance of the color filter layer are varied. For the color filter layer twice as thick as the conventional color filter, the transmittance and the color appearance are 46% and 24.9%, respectively. On the other hand, for the color filter layer 1.3 times as thick as the conventional color filter, the transmittance and the color appearance are 54.7% and 14.1%, respectively. Consequently, if the color filter layer of the transmissive portion is not formed with a desired thickness, the color property of the transmissive portion can not approach that of the reflective portion.

Furthermore, since the step of the color filter layer also degrades the planarization property of the common electrode on the color filter layer, the display quality of conventional LCDs is degraded.

SUMMARY OF THE INVENTION

Accordingly, the present invention is directed to a reflective liquid crystal display device that substantially obviates one or more of the problems due to limitations and disadvantages of the related art.

An object of the present invention is to provide a color filter substrate of a reflective liquid crystal display device that has a high transmittance and color purity, and a manufacturing method of the color filter substrate.

Another object of the present invention is to provide a color filter substrate of a reflective liquid crystal display device that has a high color purity, and a manufacturing method of the color filter substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a color filter substrate for a liquid crystal display device according to an embodiment of the present invention includes: a substrate having a transmissive portion and a reflective portion, the transmissive portion having a groove; a black matrix on the substrate; and a color filter layer on the black matrix and on the substrate.

In another aspect, a method of fabricating a color filter substrate for a liquid crystal display device includes: forming a groove on a substrate, the substrate having a transmissive portion and a reflective portion, the transmissive portion having the groove; forming a black matrix on the substrate; and forming a color filter layer of a first color on the black matrix and the substrate.

In another aspect, a color filter substrate for a liquid crystal display device includes: a substrate having a transmissive portion and a reflective portion; a black matrix on the substrate; a plurality of buffer patterns at the reflective portion, the plurality of buffer patterns having a substantially uneven shape; and a color filter layer at the transmissive and reflective portions.

In another aspect, a method of fabricating a color filter substrate for a liquid crystal display device includes: forming a black matrix on a substrate, the substrate having a transmissive portion and a reflective portion; forming a plurality of buffer patterns at the transmissive portion, the plurality of buffer patterns having a substantially uneven shape; and forming a color filter layer at the transmissive and reflective portions.

It is to be understood that both the foregoing general description and the following detailed description are exemplary and explanatory and are intended to provide further explanation of the invention as claimed.

BRIEF DESCRIPTION OF THE DRAWINGS

The present invention will become more fully understood from the detailed description given hereinbelow and the accompanying drawings which are given by way of illustration only, and thus do not limit the present invention.

In the drawings.

DETAILED DESCRIPTION OF PREFERRED EMBODIMENTS

Reference will now be made in detail to the preferred embodiments of the present invention, example of which is illustrated in the accompanying drawing.

Figure 1:
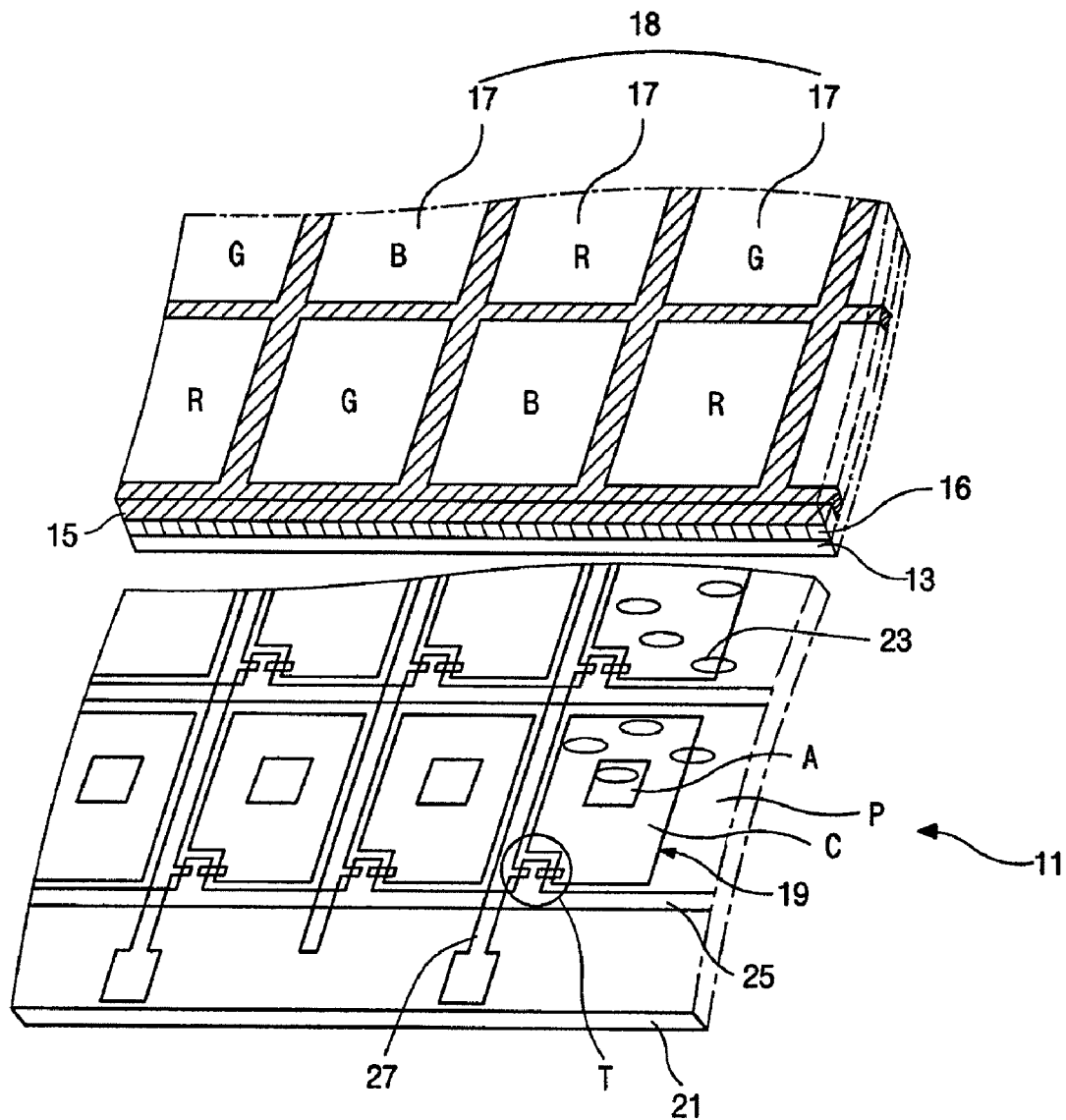
FIG. 1 is a schematic perspective view of a conventional transflective LCD device.
Figure 2:
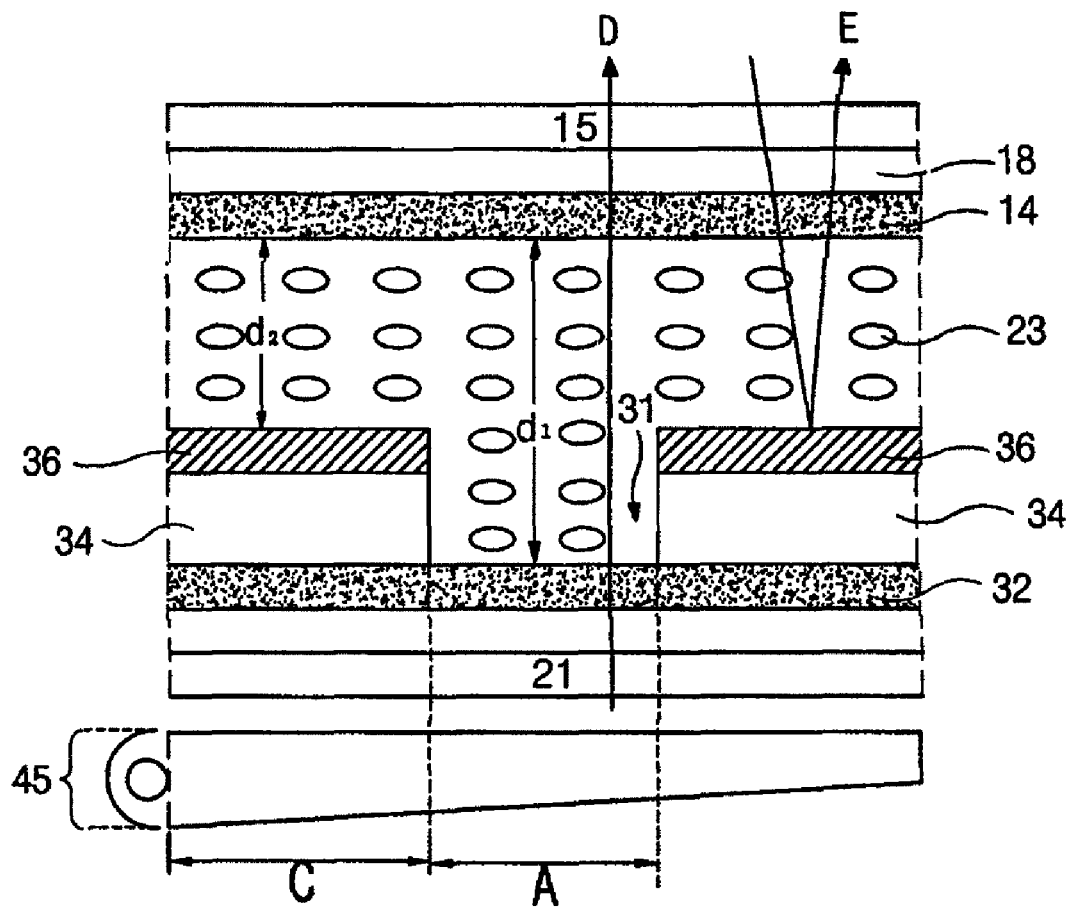
FIG. 2 is a schematic cross-sectional view of a conventional transflective LCD device.
Figure 3A:
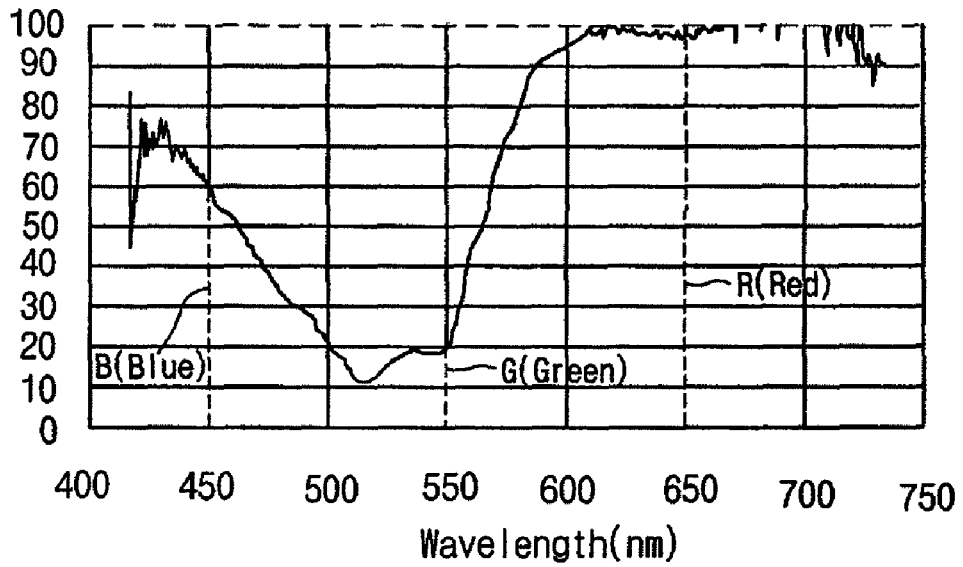
FIGS. 3A and 3B are transmittance spectrums of first and second red color filter layers for the reflective mode having a specific thickness and twice of the specific thickness, respectively, according to a related art.
Figure 3B:
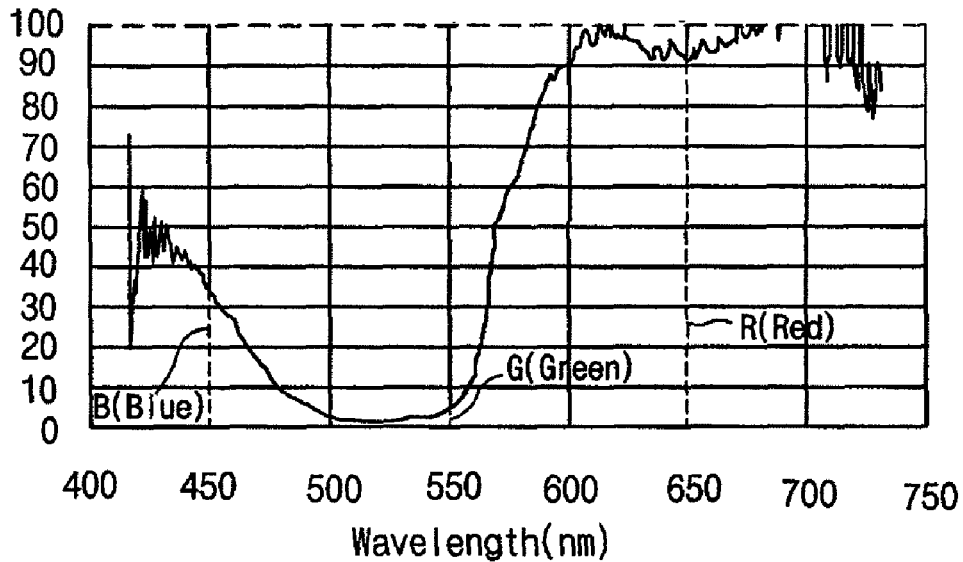
Figure 4:
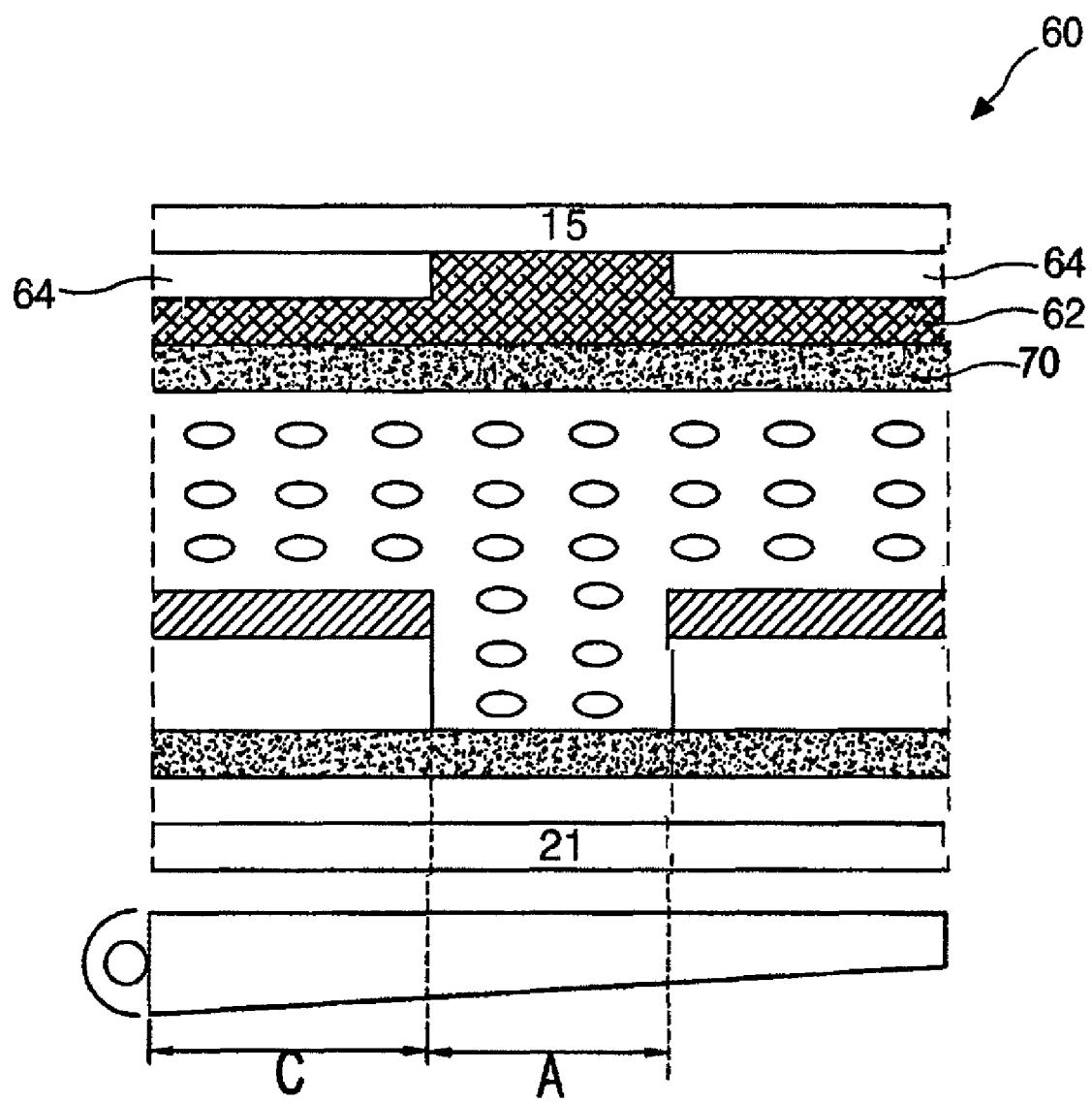
FIG. 4 is a cross-sectional view of a transflective LCD device using DCF.
Figure 5A:
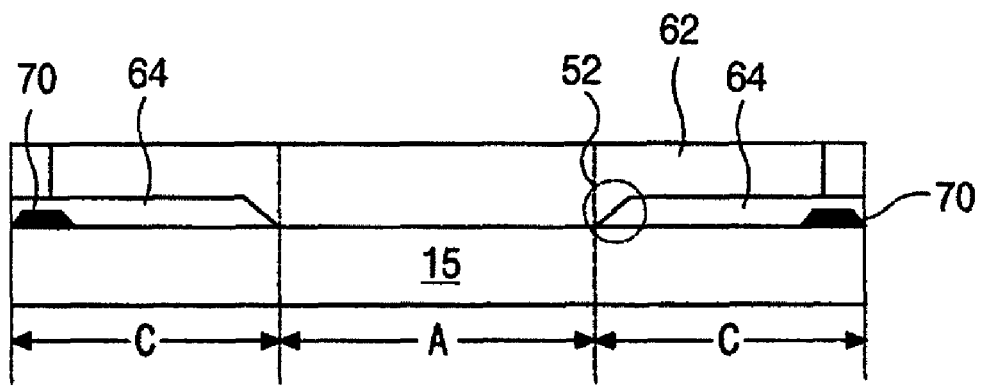
FIGS. 5A and 5B are cross-sectional views of color filter substrates using DCF having transparent buffer layers of first and second thicknesses, respectively, according to a related art.
Figure 5B:
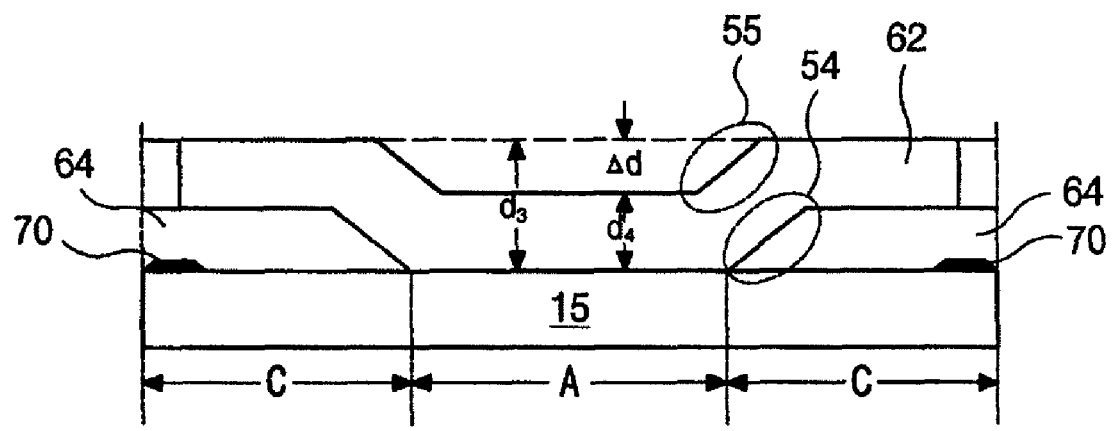
Figure 6A:
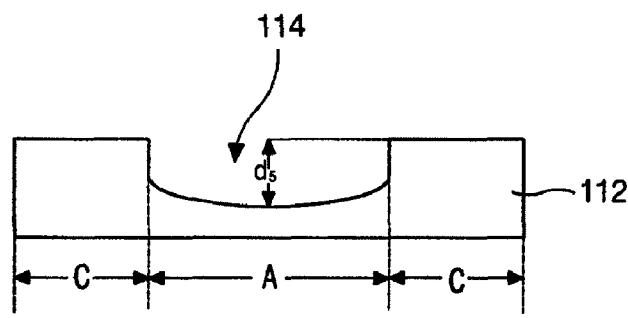
FIGS. 6A to 6C are schematic cross-sectional views of a color filter substrate illustrating a fabricating process according to a first embodiment of the present invention.
Figure 6B:
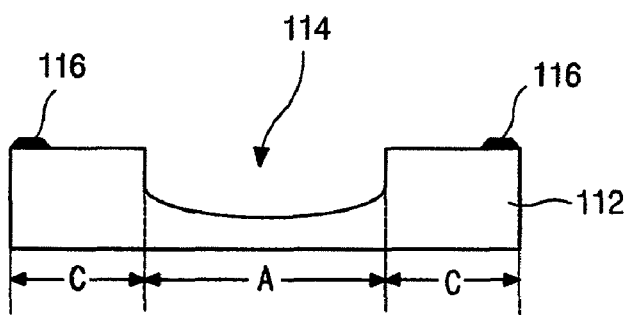
Figure 6C:
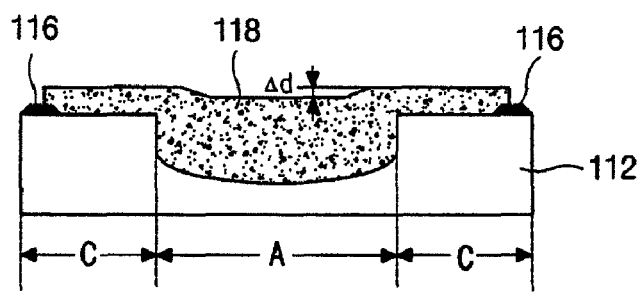

FIGS. 6A to 6C are schematic cross-sectional views of a color filter substrate illustrating a fabricating process thereof according to a first embodiment of the present invention. The color filter substrate is usable in any type of an LCD device or other display device. In FIGS. 6A to 6C, the substrate 112 has a transmissive portion "A" and a reflective portion "C".

In FIG. 6A, a groove 114 is formed at the transmissive portion "A" of the LCD device by photolithography and etching processes, or other techniques. The depth $d_5$ from the top surface of an upper substrate 112 is determined considering the thickness ratio of the color filter layer between the transmissive and reflective portions "A" and "C". Preferably, this thickness ratio may be 1:2.

In FIG. 6B, a black matrix 116 is formed on the substrate 112 by depositing and patterning a black resin or an opaque metallic material.

In FIG. 6C, a color filter layer 118 of a first color is formed over the substrate 112 and a portion of the black matrix 116 by depositing and patterning a color resin. By repeating this process for second and third colors, a color filter layer of three colors can be selectively formed on the substrate 112. The step height "Δd" of the color filter layer 118 is within a range of about 0.1 to a few micrometers.

Figure 7:
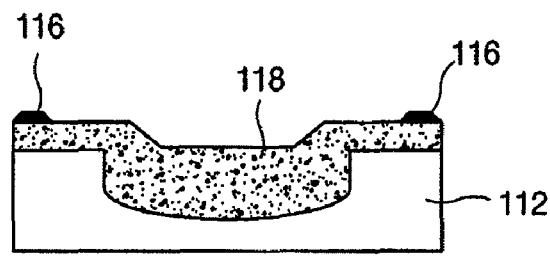
FIG. 7 is a schematic cross-sectional view of a color filter substrate according to a second embodiment of the present invention.

FIG. 7 a schematic cross-sectional view of a color filter substrate according to a second embodiment of the present invention.

In FIG. 7, the color filter substrate is identical to that in the first embodiment, except that a black matrix 116 is formed on a color filter layer 118 and the dimensions of the color filter substrate may vary as needed.

In the case of a transparent plastic substrate, a groove can be formed by a molding process during a fabricating process of the substrate and the molding process is more suitable to the control of the depth than the etching process.

Figure 8A:
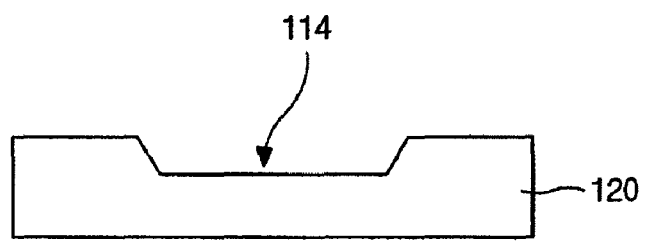
FIGS. 8A to 8C are schematic cross-sectional views of a color filter substrate illustrating a fabricating process according to a third embodiment of the present invention.
Figure 8B:
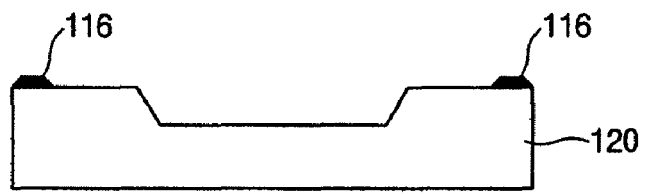
Figure 8C:
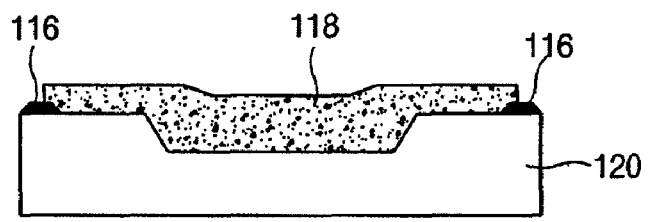

FIGS. 8A to 8C are schematic cross-sectional views of a color filter substrate for an LCD device illustrating a fabricating process thereof according to a third embodiment of the present invention.

In FIG. 8A, a substrate 120 is made of transparent plastic so that a groove 114 can be formed at a transmissive portion of the LCD by a molding process during a fabricating process of the substrate 120. The use of a transparent plastic material allows an easy control over the profile of the groove 114.

In FIG. 8B, a black matrix 116 is then formed selectively on the substrate 112 by depositing and patterning a black resin, an opaque metallic material, or the like.

In FIG. 8C, a color filter layer 118 of a first color is formed on the substrate 120 and portions of the black matrix 116 by depositing and patterning a color resin. By repeating this process for second and third colors, a color filter layer of three colors can be selectively formed on the substrate 120. This completes the process of forming the color filter substrate according to this embodiment.

Figure 9:
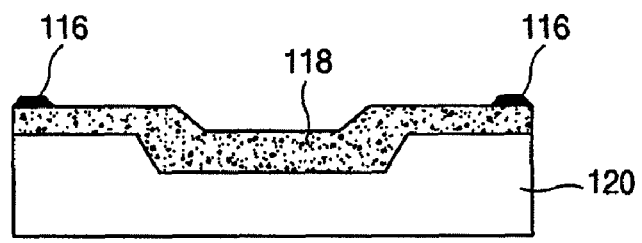
FIG. 9 is a schematic cross-sectional view of a color filter substrate according to a fourth embodiment of the present invention.

FIG. 9 is a schematic cross-sectional view of a color filter substrate for an LCD device according to a fourth embodiment of the present invention.

In FIG. 9, the color filter substrate is identical to that of the third embodiment, except that a black matrix 116 is formed on a color filter layer 118 and the dimensions of the color filter substrate may vary as needed.

FIGS. 10A to 10D are schematic cross-sectional views except that of a color filter substrate for an LCD device illustrating a fabricating process thereof according to a fifth embodiment of the present invention. In this embodiment as shown FIGS. 10A to 10D, the substrate 112 has a transmissive portion "A" and a reflective portion "C".

Figure 10A:
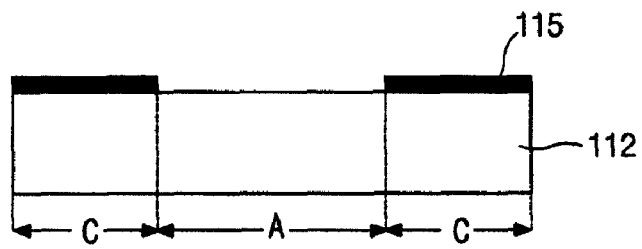
FIGS. 10A to 10D are schematic cross-sectional views of a color filter substrate illustrating a fabricating process according to a fifth embodiment of the present invention.

In FIG. 10A, after depositing an opaque metallic material on the substrate 112, an opaque metal pattern 115 is formed by selectively removing the deposited opaque metallic material in the transmissive portion "A".

Figure 10B:
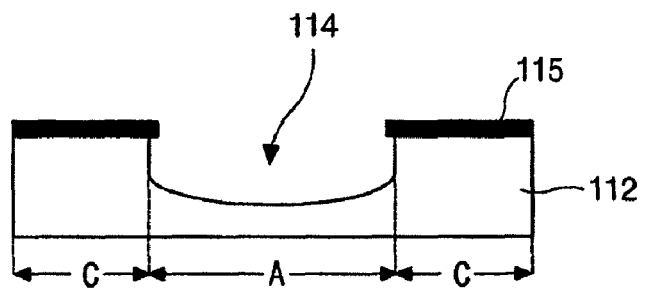

In FIG. 10B, a groove 114 is then formed at the transmissive portion "A" by selectively etching the substrate 112 in the transmissive portion "A" as the opaque metal pattern 115 is used as a mask for this etching process.

Figure 10C:
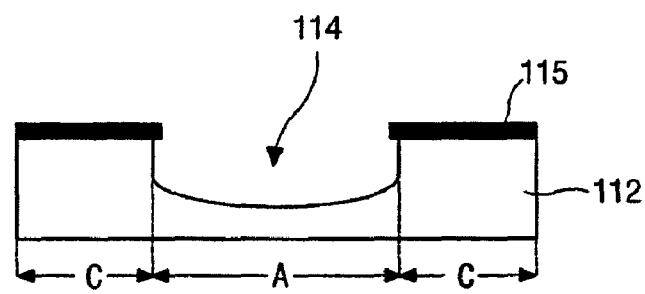

In FIG. 10C, a black matrix 116 is then formed by selectively etching the opaque metal pattern 115.

Figure 10D:
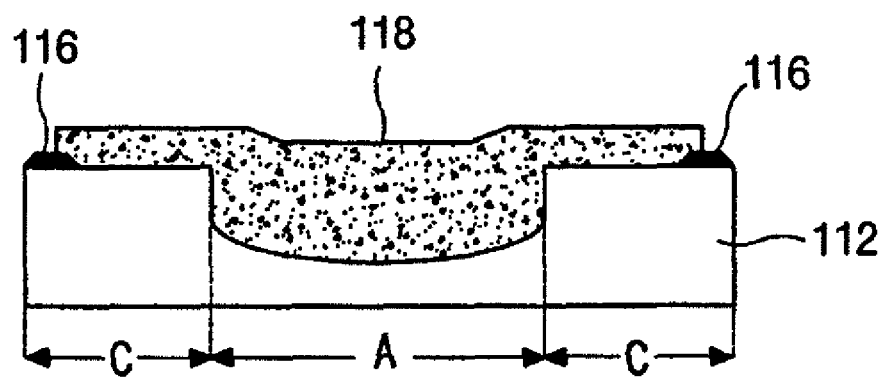

In FIG. 10D, a color filter layer 118 of a first color is formed by depositing and patterning a color resin on the substrate 112 and the black matrix 116. By repeating this process for second and third colors, a color filter layer of three colors can be formed selectively on the substrate 112.

In the first to fifth embodiments, since the groove of the transmissive portion is formed by etching the substrate itself, a separate buffer layer is not necessary and thus, the production cost of the color filter substrate can be reduced. If the substrate of transparent plastic is used, the etching process for the groove is also unnecessary due to the molding process, which further reduces the production cost. Moreover, since the buffer layer is not used, the substrate of the reflective portion does not have an interface between the buffer layer and the substrate so that the reflection from the interface can not occur and the device performance is improved.

However, since the color filter layer has a step at its top surface, the thickness ratio of the color filter layer between the transmissive and reflective portions has a limit so that the improvement of color property can be somewhat limited. Therefore, a method is provided in the present invention for obtaining a desired thickness ratio and minimizing the step at the top surface of the color filter layer. This method employs a plurality of buffer patterns as discussed below.

Figure 11:
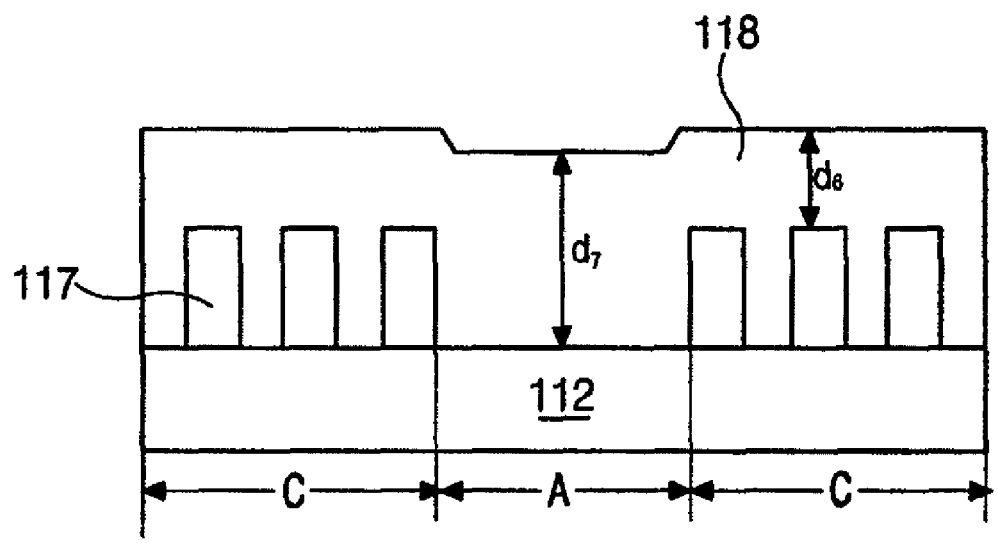
FIG. 11 is a schematic cross-sectional view of a color filter substrate illustrating the principle of the present invention.

FIG. 11 is a schematic cross-sectional view of a color filter substrate illustrating the principle of the present invention.

In FIG. 11, a substrate 112 has a transmissive portion "A" and a reflective portion "C" and a plurality of buffer patterns 117 having a substantially uneven shape are formed at the reflective portion "C". The shape of the buffer patterns 117 can be any shape. Since the plurality of buffer patterns 117 have a lot of fine grooves, the thickness "$d_6$" of color filter layer of the reflective portion "C" can be reduced or minimized so that the thickness ratio ($d_6$:$d_7$) of the color filter layer between the transmissive and reflective portions "A" and "C" can be increased. Therefore, the color difference between the transmissive and reflective portions "A" and "C" can be further reduced.

FIGS. 12A to 12F are schematic top plan views of a plurality of buffer patterns usable in a color filter substrate according to several embodiments of the present invention. In FIGS. 12A to 12F, a hatched region means an etched region, i.e., a concave region and a white region means a buffer pattern, i.e., a convex region.

Figure 12A:
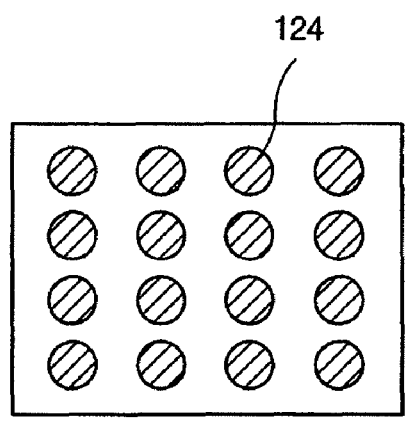
FIGS. 12A to 12F are schematic plan views of a plurality of buffer patterns according to several embodiments of the present invention.
Figure 12B:
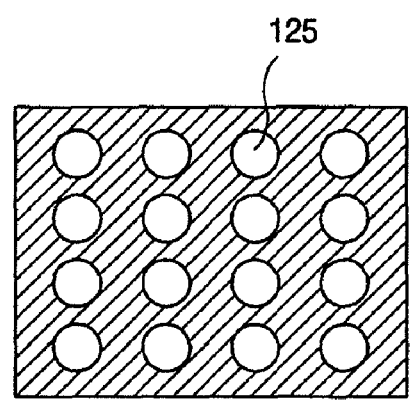

As shown in FIGS. 12A and 12B, a buffer pattern having a plurality of circular concave holes 124, and a plurality of circular convex buffer patterns 125 are provided.

Figure 12C:
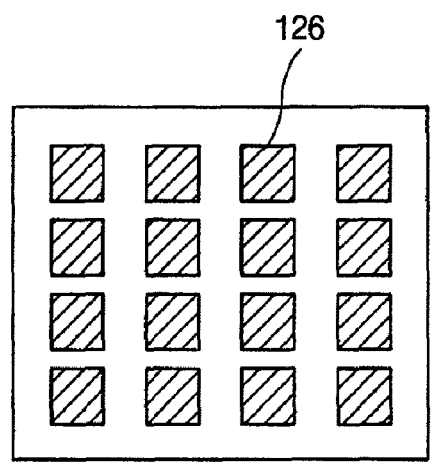
Figure 12D:
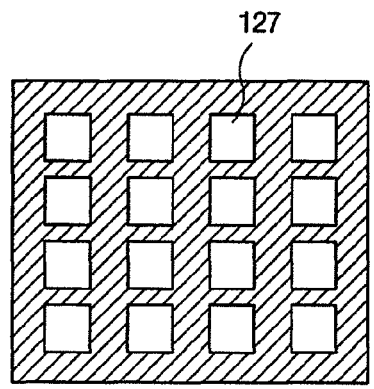

In FIGS. 12C and 12D, a buffer pattern having a plurality of concave holes 126 and convex buffer patterns 127 have a rectangular shape.

Figure 12E:
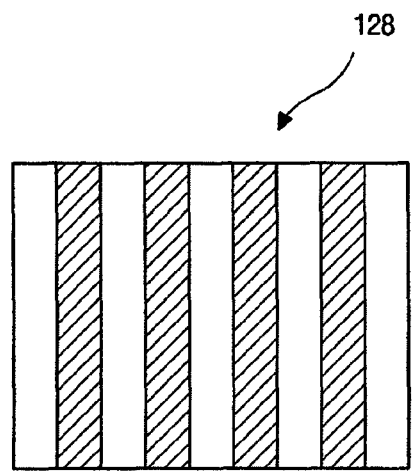
Figure 12F:
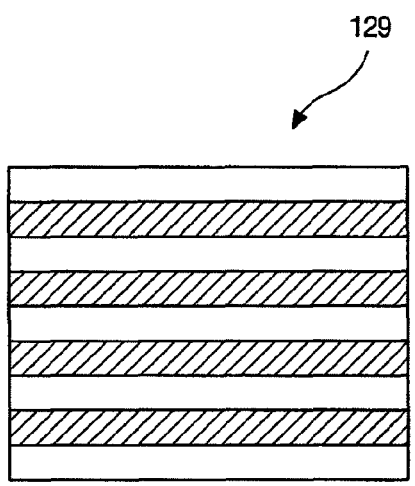

In FIGS. 12E and 12F, a plurality of buffer patterns 128 and 129 are formed along the direction of columns and rows, respectively.

Figure 13A:
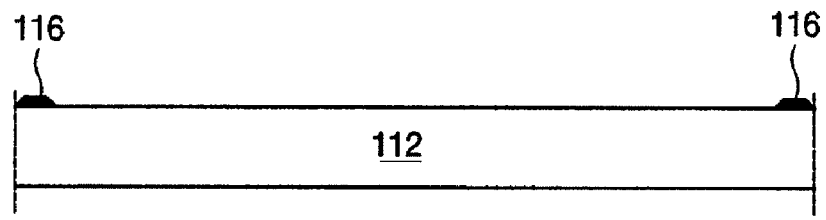
FIGS. 13A to 13C are schematic cross-sectional views of a color filter substrate illustrating a fabricating process according to a sixth embodiment of the present invention.
Figure 13B:
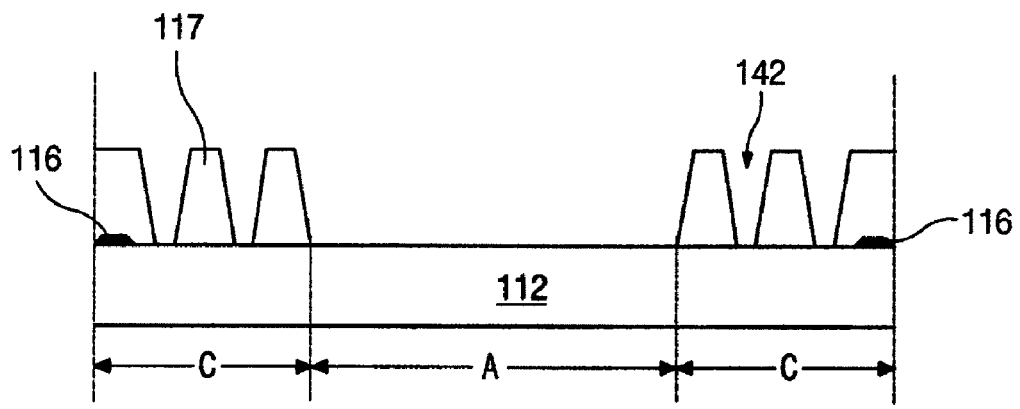
Figure 13C:
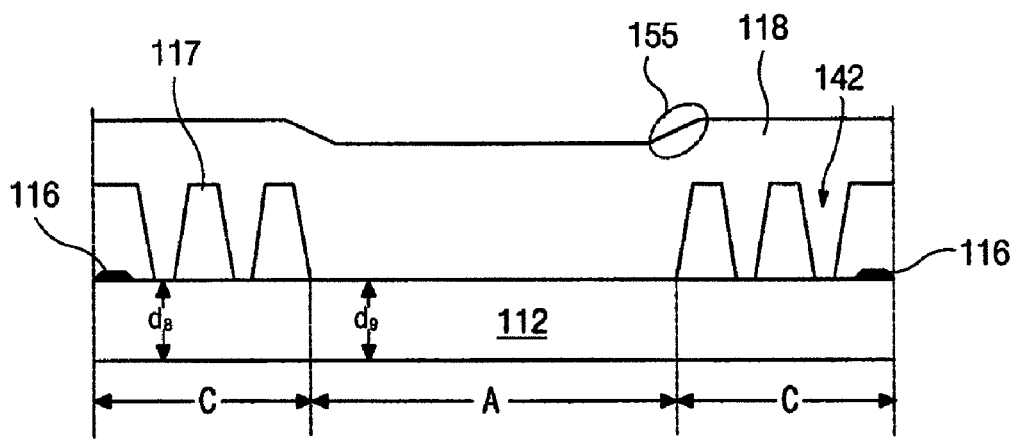

FIGS. 13A to 13C are schematic cross-sectional views of a color filter substrate illustrating a fabricating process thereof according to a sixth embodiment of the present invention.

In FIG. 13A, a black matrix 116 is formed on a substrate 112. The black matrix 116 has a structure of a single layer of chromium (Cr) or a double layer of chromium (Cr) and chromium oxide (CrOx).

In FIG. 13B, a plurality of buffer patterns 117 covering the black matrix 116 are formed only at the reflective portion "C" by depositing and etching a transparent material such as benzocyclobutene (BCB), acrylic resin, or silicon nitride (SiNx). The plurality of buffer patterns 117 have a substantially uneven shape, e.g., fine grooves 142 between projections.

In FIG. 13C, a color filter layer 118 is formed on the plurality of buffer patterns 117. Even though the color filter layer 118 is not planarized, a reduced step 155 is produced due to the fine grooves 142 between the plurality of buffer patterns. Here, the height "$d_8$" of the bottom of the grooves 142 equals the height "$d_9$" of the surface of the substrate 112 at the transmissive portion "A". By repeating this process for three color filters, a full color filter layer of three colors can be formed.

Figure 14:
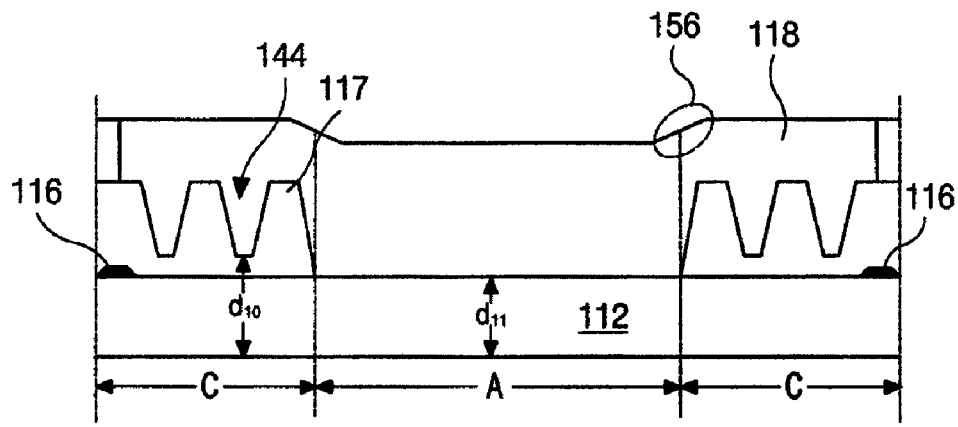
FIG. 14 is a schematic cross-sectional view of a color filter substrate according to a seventh embodiment of the present invention.

FIG. 14 is a schematic cross-sectional view of a color filter substrate according to a seventh embodiment of the present invention.

In FIG. 14, the color filter substrate is identical to that shown in FIG. 13C, except that the height "$d_{10}$" from the bottom surface of grooves 144 to the bottom surface of the substrate 112 is larger than the height "$d_{11}$" of the substrate 112 at the transmissive portion "A". In this structure, since the plurality of buffer patterns 117 can be lowered, a surface step 156 of the color filter layer 118 can be further reduced.

FIGS. 15A to 15D are schematic cross-sectional views of a color filter substrate illustrating a fabricating process thereof according to an eighth embodiment of the present invention.

Figure 15A:
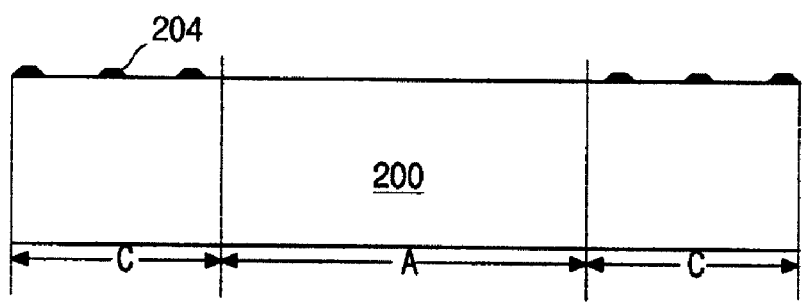
FIGS. 15A to 15D are schematic cross-sectional views of a color filter substrate illustrating a fabricating process according to an eighth embodiment of the present invention.

As shown in FIG. 15A, in this embodiment of the color filter substrate, a substrate 200 has a transmissive portion "A" and a reflective portion "C". An opaque metal pattern 204 is formed selectively on the substrate 200 only at the reflective portion "C".

Figure 15B:
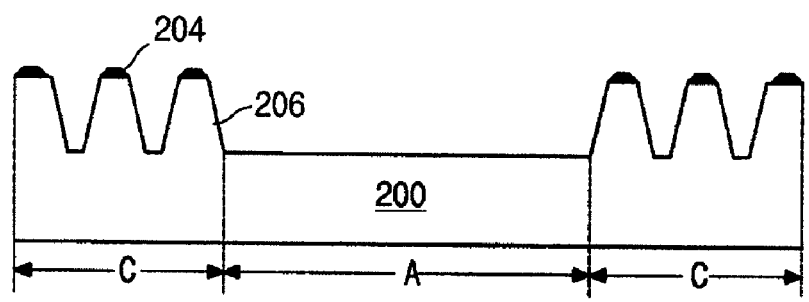

In FIG. 15B, a plurality of buffer patterns 206 are formed by selectively etching the substrate 200 while the opaque metal pattern 204 is used as a mask. In this etching process, the substrate 200 under the opaque metal pattern 204 is not etched to become a convex portion of the plurality of buffer patterns 206. Also, a portion of the substrate 200 in the transmissive portion "A" is removed to provide a groove 250.

Figure 15C:
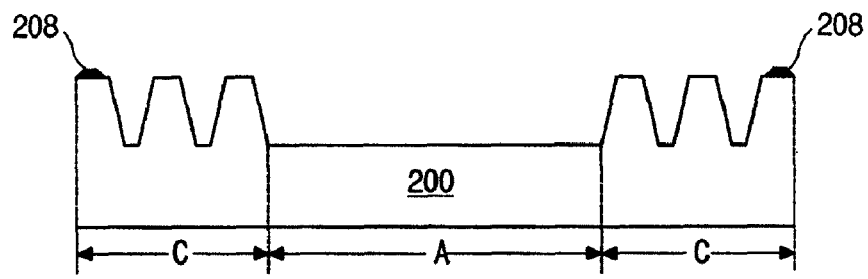

In FIG. 15C, a black matrix 208 is then formed by further etching the opaque metal pattern 204.

Figure 15D:
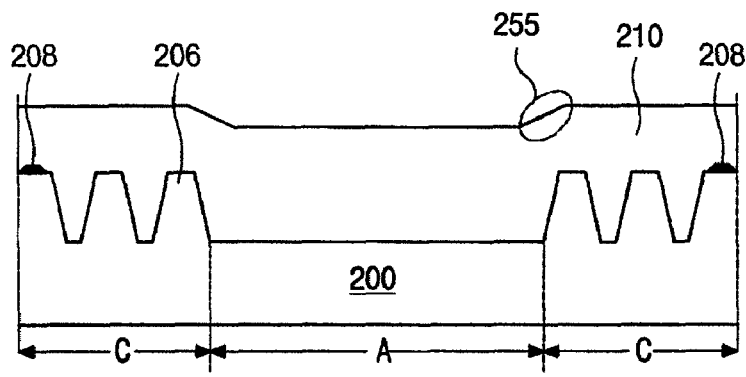

In FIG. 15D, a color filter layer 210 is formed over the substrate 200. Even though the color filter layer 210 has a surface step 255 between the transmissive and reflective portions "A" and "C", the surface step 255 is reduced due to the plurality of buffer patterns 206.

Figure 16:
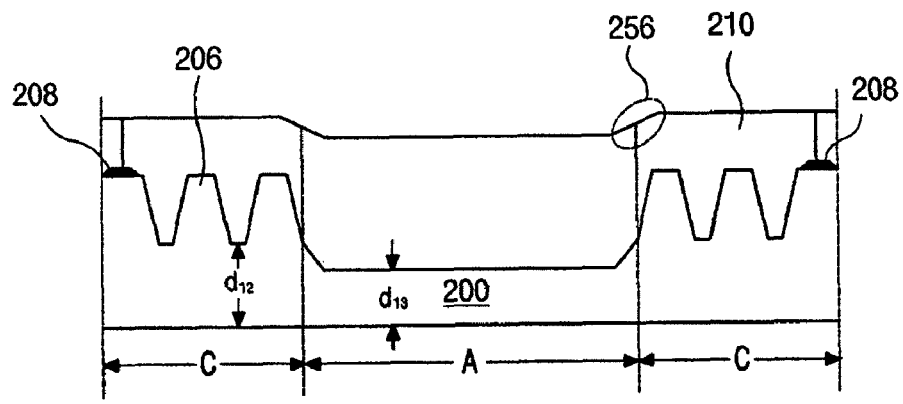
FIG. 16 is a cross-sectional view of a color filter substrate according to a ninth embodiment of the present invention.

FIG. 16 is a cross-sectional view of a color filter substrate according to a ninth embodiment of the present invention.

As shown in FIG. 16, the color filter substrate is identical to that shown in FIG. 15O, except that the height "$d_{12}$" from the bottom surface of the plurality of buffer patterns 206 to the bottom surface of the substrate 200 is bigger than the height "$d_{13}$" of the substrate 200 at the transmissive portion "A". The ninth embodiment can be acquired by adding an etching process for the transmissive portion "A" to the process of the eighth embodiment shown in FIGS. 15A to 15D. In the ninth embodiment structure, since the plurality of buffer patterns 206 can be lowered, a surface step 256 of the color filter layer 210 is further reduced so that the color purity of the display device can be further improved.

The plurality of buffer patterns according to the embodiments of the present invention can have a uniform pitch in the range of about 14 to 45 micrometers.

The present invention is not limited to LCD devices, but is applicable to other types of display devices and apparatuses.

It will be apparent to those skilled in the art that various modifications and variation can be made in the method of manufacturing a flat pane display device of the present invention without departing from the spirit or scope of the invention. Thus, it is intended that the present invention cover the modifications and variations of this invention provided they come within the scope of the appended claims and their equivalents.

What is claimed is:

1. A color filter substrate for a liquid crystal display device, comprising:
   a base substrate having a plurality of first regions and a plurality of second regions;
   a black matrix on the base substrate;
   a plurality of buffer patterns at each of the plurality of second regions except the first regions, one of the plurality of buffer patterns covering an entire of one of the second regions and having concave portions at the one of the second regions; and
   a color filter layer at the first and second regions.

2. The color filter substrate according to claim 1, wherein the plurality of buffer patterns are formed by selectively removing the base substrate.

3. The color filter substrate according to claim 2, wherein the base substrate is made of glass.

4. The color filter substrate according to claim 1, wherein the plurality of buffer patterns are formed by depositing and selectively removing a transparent material.

5. The color filter substrate according to claim 4, wherein the plurality of buffer patterns are formed of one of benzocyclobutene, acrylic resin and silicon nitride.

6. The color filter substrate according to claim 1, wherein the plurality of buffer patterns have a uniform pitch.

7. The color filter substrate according to claim 6, wherein the pitch is within a range of about 14 to 45 micrometers.

8. The color filter substrate according to claim 1, wherein a bottom surface of the plurality of the buffer patterns is located higher than a top surface of the first region of the base substrate.

9. A color filter substrate for a liquid crystal display device, comprising:
   a base substrate having a plurality of first regions and a plurality of second regions;
   a black matrix on the base substrate;
   a plurality of buffer patterns at each of the plurality of second regions, one of the plurality of buffer patterns covering an entire of one of the second regions and having concave portions at the one of the second regions; and
   a color filter layer at the first and second regions,
   wherein the color filter at the first region is thicker than that at the second region.

* * * * *